United States Patent
Kumar et al.

(10) Patent No.: US 11,222,035 B2
(45) Date of Patent: Jan. 11, 2022

(54) CENTRALIZED MULTI-TENANCY AS A SERVICE IN CLOUD-BASED COMPUTING ENVIRONMENT

(71) Applicant: SAP SE, Walldorf (DE)

(72) Inventors: Dinesh Kumar, Bangalore (IN); Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/807,763

(22) Filed: Mar. 3, 2020

(65) Prior Publication Data

US 2021/0279247 A1 Sep. 9, 2021

(51) Int. Cl.
| | |
|---|---|
| G06F 7/00 | (2006.01) |
| G06F 16/25 | (2019.01) |
| G06F 16/903 | (2019.01) |
| G06F 16/901 | (2019.01) |

(52) U.S. Cl.
CPC .......... *G06F 16/252* (2019.01); *G06F 16/256* (2019.01); *G06F 16/903* (2019.01); *G06F 16/9027* (2019.01)

(58) Field of Classification Search
CPC ............. G06F 16/24522; G06F 16/243; G06F 16/252; G06F 16/903; G06F 16/256; G06F 16/9027
USPC .......................... 707/705, 706, 999.002, 717
See application file for complete search history.

(56) References Cited

U.S. PATENT DOCUMENTS

2017/0075953 A1* 3/2017 Bozkaya ........... G06F 16/24522

OTHER PUBLICATIONS

Braun et al., "MT Base: Optimizing Cross-Tenant Database Queries", Mar. 13, 2017, arxiv.org, Cornell University Library, 201 Olin Library Cornell University Ithaca, NY, 14853, 15 pp.
Anonymous: "Configuring Sap Afaria Content", Jan. 16, 2019, Retrieved from the Internets: URL:https://help.sap.com/doc/61ac276217ec48da910dd0e79bde6ca5/7.0.32/en-US/Configuring_Afaria.pdf, 258 pp.
Anonymous: SAP BusinessObjects Business Intelligence Platform Document Version: 4.2 Nov. 12, 2015 Multitenancy Guide 126 pp.
Extended European Search Report, EP Application No. 20204588.6-1203, dated Apr. 1, 2021, 8 pp.

\* cited by examiner

*Primary Examiner* — Md I Uddin
(74) *Attorney, Agent, or Firm* — Buckley, Maschoff & Talwalkar LLC

(57) ABSTRACT

Some embodiments may be associated with a cloud-based computing environment. A centralized multi-tenancy service may include an application interface to receive a query from one of a plurality of applications. A tenant policy store may contain declarative tenant policies, and a tenant policy manager engine may automatically process the received query based on at least one tenant policy. If the received query is not processed successfully, the centralized multi-tenancy service may return an error message to the application via the application interface. If the received query is processed successfully, the centralized multi-tenancy service may exchange information with a multi-tenant service instance (e.g., a multi-tenant database as a service instance) and return a data result to the application via the application interface.

13 Claims, 12 Drawing Sheets

WHERE USER 1, USER 2, USER 3, ... USER $N \in$ TENANT2

US 11,222,035 B2

CENTRALIZED MULTI-TENANCY AS A SERVICE IN CLOUD-BASED COMPUTING ENVIRONMENT

BACKGROUND

An enterprise may utilize applications or services executing in a cloud-based computing environment. For example, a business might utilize applications that access a database at a data center to process purchase orders, human resources tasks, payroll functions, etc. Note that a cloud-based computing environment might want to support multiple tenants (e.g., associated with different enterprises). There are different ways that multi-tenancy may be achieved in a service (such as PostgreSQL). Schema-based and database-based separation may, for example, help a system achieve this in some ways. However, it is worth noting that such separation of tenants may not be possible and/or desirable in many cases. For example, some cloud Software as a Services ("SaaS") implementations may also rely on tenant identifier columns in each table. This, in turn, can result in a complicated implementation and the application may become more susceptible to bugs (which could result in the exposure of restricted data to unauthorized parties).

It would therefore be desirable to provide a centralized multi-tenancy service for a cloud-based computing environment, decoupled from the application and infrastructure service, that can implement tenant policies in an efficient and secure manner.

SUMMARY

Methods and systems may be associated with a cloud-based computing environment. Some embodiments may be associated with a cloud-based computing environment. A centralized multi-tenancy service may include an application interface to receive a query from one of a plurality of applications. A tenant policy store may contain declarative tenant policies, and a tenant policy manager engine may automatically process the received query based on at least one tenant policy. If the received query is not processed successfully, the centralized multi-tenancy service may return an error message to the application via the application interface. If the received query is processed successfully, the centralized multi-tenancy service may exchange information with a multi-tenant service instance (e.g., a multi-tenant database as a service instance) and return a data result to the application via the application interface.

Some embodiments comprise: means receiving, via an application interface of a centralized multi-tenancy service, a query from one of a plurality of applications; means for retrieving, by a tenant policy manager engine from a tenant policy store that contains declarative tenant policies, at least one tenant policy; means for validating, by the tenant policy manager engine, the received query based on the at least one tenant policy; if the received query is not processed successfully, means for returning an error message to the application via the application interface; and if the received query is processed successfully, means for exchanging information with a multi-tenant service instance and returning a data result to the application via the application interface.

Some technical advantages of some embodiments disclosed herein are improved systems and methods to provide a centralized multi-tenancy service for a cloud-based computing environment, decoupled from the application and infrastructure service, that can implement tenant policies in an efficient and secure manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
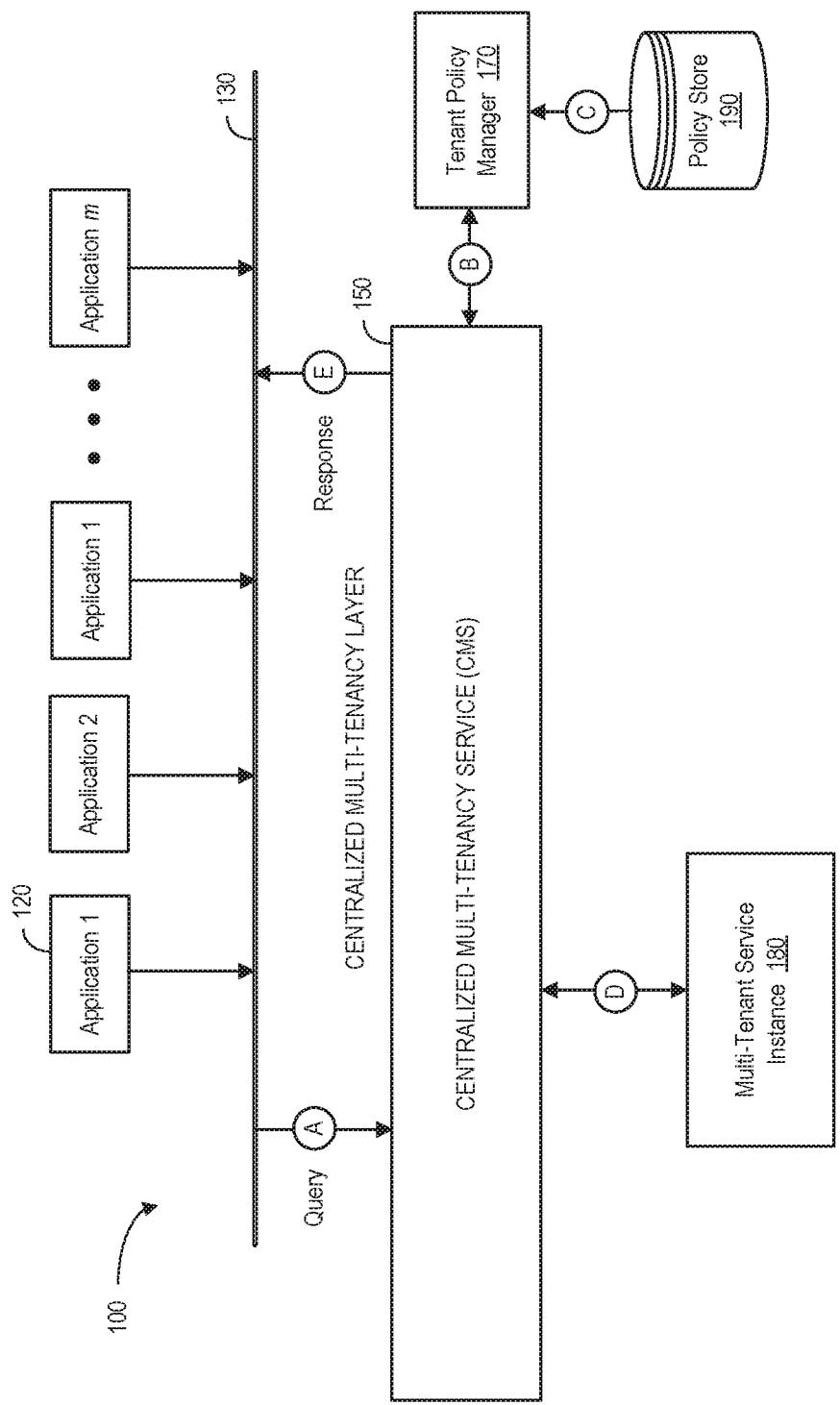
FIG. 1 is a high-level system architecture in accordance with some embodiments.

Some embodiments described herein provide a centralized multi-tenancy service for a cloud-based computing environment, decoupled from the application and infrastructure service, that can implement tenant policies in an efficient and secure manner. For example, FIG. 1 is a high-level system 100 architecture in accordance with some embodiments. The system 100 includes a centralized multi-tenancy service 150 that receives a request at (A) from an application 120 (e.g., an application 120 that is not multi-tenant aware and is executing in an application layer) via an application interface 130. Moreover, the centralized multi-tenancy service 150 is associated with a tenant policy manager 170 and a policy store 190 in accordance with any of the embodiments described herein. As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAY") network, a Bluetooth network, a wireless LAN network, and/or an Internet Protocol ("IP") network such as the Internet, an intranet, or an extranet. Note that any devices described herein may communicate via one or more such communication networks.

The centralized multi-tenancy service 150 may store information into and/or retrieve information from various data stores, such as the policy store 190, which may be locally stored or reside remote from the centralized multi-tenancy service 150. Although a single centralized multi-tenancy service 150 is shown in FIG. 1, any number of such devices may be included. Moreover, various devices described herein might be combined according to embodiments of the present invention. The system 100 functions may be performed by a constellation of networked apparatuses, such as in a distributed processing or cloud-based architecture.

An operator or administrator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the system 100.

After receiving the query at (A), the system 100 may access the tenant policy manager 170 that can retrieve an appropriate tenant policy (or policies) from the policy store 190 at (C). The tenant policy manager 170 may then automatically process the received request. As used herein, the term "automatically" may refer to a process that is performed with little or no human intervention. If the request cannot be processed successfully, an error message may be returned at (E). If the request can be processed successfully, the system may interact with a multi-tenant service instance 180 (e.g, associated with a database as a service) at (D) and the appropriate data may then be provided back to the application 120 in a response to the request at (E).

Figure 2:
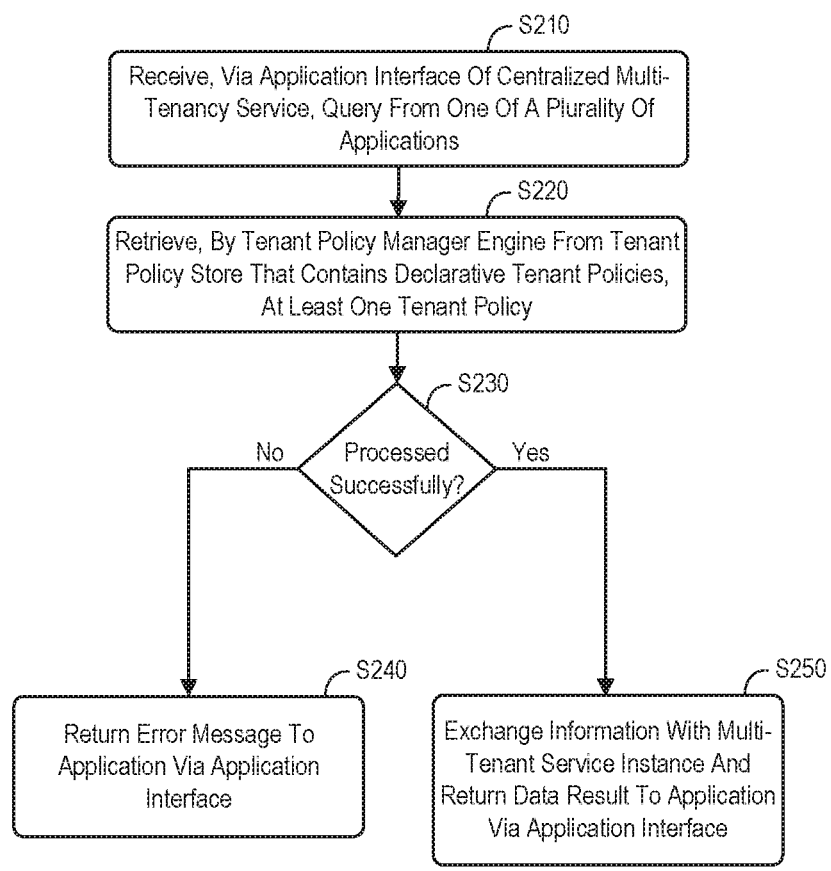
FIG. 2 is a method according to some embodiments.

FIG. 2 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, the system may receive, via an application interface of a centralized multi-tenancy service, a query from one of a plurality of applications. At S220, a tenant policy manager engine may retrieve, from a tenant policy store that contains declarative tenant policies, at least one tenant policy. At S230, the system may process the received query based on the at least one tenant policy. This processing might include, for example, tokenizing, parsing, validating, identifying and applying a policy, etc. If the received query is not processed successfully at S230 (e.g., is not validated or otherwise processed successfully), the system may return an error message to the application via the application interface at S240 (e.g., when a global constraint policy rejects user access). If the received query is processed successfully at S230, the system may exchange information with a multi-tenant service instance and return a data result to the application via the application interface at S250.

Thus, in order solve multi-tenancy challenges, some embodiments may provide a centralized multi-tenancy service. The centralized multi-tenancy service might be considered, in some cases, as a service layer that is completely decoupled from the application and infrastructure service (such as PostgreSQL) and is placed between them. The centralized multi-tenancy service may include a tenant policy engine or manager that receives, processes, and/or stores complicated tenant-based policies. These policies may, for example, filter and/or transform data that is sent back to various applications. The policies may be, in some embodiments, declarative in nature and be given as an input to the policy engine. The centralized multi-tenancy service may apply these policies to queries from the application(s) during runtime and thus control the data that a tenant is allowed view and/or operate upon on a request-by-request basis.

According to some embodiments, the centralized multi-tenancy service may be executed and/or hosted co-locally (e.g., in the same virtual or physical machine where a database service is executed) on a permanent basis. In other embodiments, the centralized multi-tenancy service can be executed as a function as a service co-locally when a request needs to be processed. Note that the co-located nature (and communication over domain sockets) may help improve performance because no additional hops are involved in the execution flow.

According to some embodiments, the centralized multi-tenancy service may be flexible and easy to use. Moreover, the centralized multi-tenancy service may be associated with any other service such as MongoDB® as a Service, Cassandra® as a Service, etc. In such cases, custom query parsers and policy parsers may be implemented as plug-ins so that the appropriate semantics can be understood by the centralized multi-tenancy service.

Note that tenant policies may be provided in a declarative manner making definition by administrators relatively straight forward. There may be different types of policies that are supported by the policy engine. For example, in some cases a tenant policy may represent a "global constraint policy." With these types of policies, constraints may be applied at the global level and therefore get applied to all objects in a database service by an administrator. Consider a requirement to design a system in such a way that only an administrator is able to access an ApplicationLogs table. In this case, the following global constraint policy might be created:

PolicyName: GCPolicy1,
    Tables: ApplicationLogs
    Action: Allow-Access Relation ApplicationLogs
    Role: administrator Also consider a system in which a recommender service should not be able to access an account table. In this case, the following global constraint policy might be created:

PolicyName: GCPolicy2,
    Tables: Account
    Action: Reject-Access Relation Account
    Role: recommenderservice As another example, in some cases a tenant policy may represent a "multi-tenant policy." Consider two tenants (tenant1 and tenant2) that are implemented and separated by schema. In this case, the following policies may be defined:
PolicyName: Tenant1Policy
Tables: <ALL>
Action: Rewrite-Relation R→tenant1.R
Role: tenant1appuser
PolicyName: Tenant2Policy
Tables: <ALL>
Action: Rewrite-Relation R→tenant2.R
Role: $tenant2appuser
These policies may imply that access to any relation may be directed to the relevant schema for each tenant.

Also consider a system in which an administrator wants to design an application in such a way that every table in the database contains a column which uniquely identifies a tenant. Instead of writing complex and error prone logic in the application, the administrator may simply define the following policy in CMS:
PolicyName: ColumnIdentifierPolicy,
Tables: <ALL>
Action: Rewrite-Predicate C→AND $table.tenantid=$tenantid
Role: $tenantid
This policy implies that any query fired to the table will be rewritten into a query with an additional predicate as shown above which would indeed return only rows that belongs to that user.

As still another example, in some cases a tenant policy may represent an "anonymous policy." This type of policy may, according to some embodiments, help an administrator anonymize data that is retrieved from a database. Consider a Machine Learning ("ML") service that needs to access investment portfolio information of all account holders to make recommendations about the latest trends in an investment. The administrator wouldn't want to share sensitive information like FirstName, LastName, AccountId, etc. to such a service. Instead, the administrator may define the following policy:
PolicyName: AccountAnonPolicy,
Tables: Account, Portfolio
Action: Rewrite-Projection P frame, lname, accounted
User: machinelearning
Such a policy may exclude the columns mentioned above in the action whenever the machinelearning user tries to access an account or portfolio table.

As yet another example, in some cases a tenant policy may represent a "data sharing policy." Note that it may be desirable to share a subset of information about a given set of users within a tenant. In this case, a data sharing policy may be used. Consider an online transportation application (e.g., Uber®) in which an administrator wants to share information about all rides associated with a family. In such cases, and administrator may define the following policies which would enable the ride information to be shared between used1 and user2 (e.g., a father and daughter, a husband and wife, etc.).
PolicyName: RideSharingPolicyUser1,
Tables: Ride
Action: Rewrite-Predicate C→OR userid=user2
User: user1
PolicyName: RideSharingPolicyUser2,
Tables: Ride
Action: Rewrite-Predicate C→OR userid=user1
User: user2

As a final example, in some cases a tenant policy may represent a "temporal policy." Temporal policies might, according to some embodiments, let an administrator direct a central multi-tenancy service to apply policies during a given interval of time. Consider a reporting service that executes once every quarter to analyze and report performance of produce sales of an online company. The administrator may want this service to access tables only during a given datetime. As a result, a temporal policy can be defined as follows:
PolicyName: ReportGenerationPolicy
Tables: Product, Order
Action: Rewrite-Predicate C→OR role in (select role from Roles where role='reportgenerator')
User: reportgenerator
Time-Constraint: [30-12-2019 18:00:00, 30-12-2019 23:00:00]
This policy may be applied by a central multi-tenancy service during the time constraint given above to give access to tables for reporting service.

Figure 3:
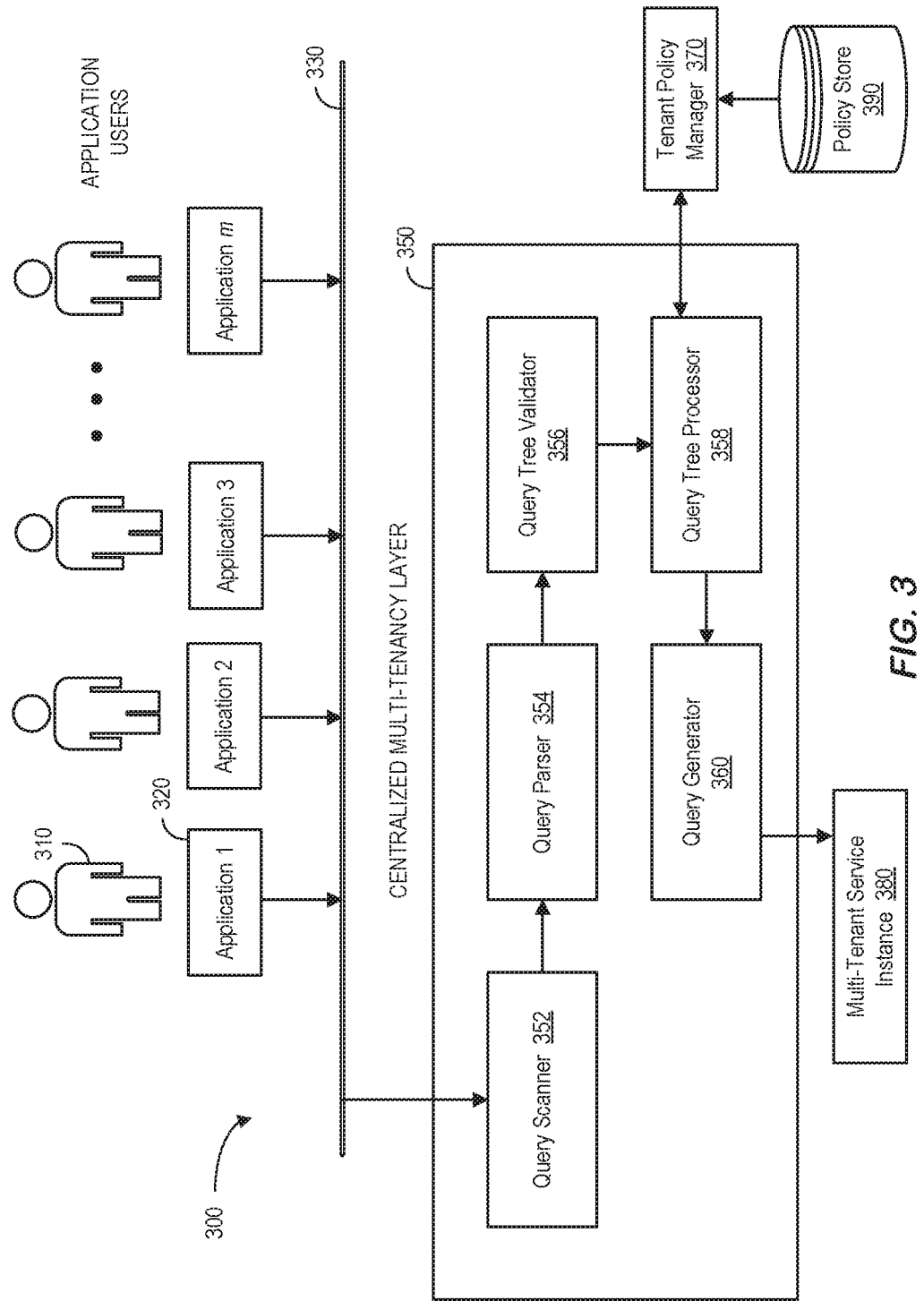
FIG. 3 is a more detailed system diagram in accordance with some embodiments.

FIG. 3 is a more detailed system 300 diagram in accordance with some embodiments. As before, the system 300 includes a centralized multi-tenant layer or system 350 that receives a request from an application 320 (e.g., an application 320, associated with an application user 310, that is not multi-tenant aware and is executing in an application layer) via an application interface 330. Moreover, the centralized multi-tenancy layer 350 is associated with a tenant policy manager 370 and a policy store 390 in accordance with any of the embodiments described herein.

In an initial configuration step, each application 320 (e.g., 1 through m) may be configured to hit the end point of the centralized multi-tenancy system 350 instead of directly accessing a multi-tenant service instance 380 (e.g., a database instance). In addition, the appropriate policies are set-up by an administrator in the tenant policy store 390. The centralized multi-tenancy system 350 may also be configured with the endpoint of multi-tenant service instance 380.

During execution, an application 320 issues a query to be executed in the service instance 380. The query may be received, according to some embodiments, by a query scanner 352 in the centralized multi-tenancy system 350. The query scanner 352 may be, for example, responsible for scanning the query and tokenizing them into tokens as defined by SQL (in the case of PostgreSQL). Referring to the prior global constraint policy named "GCPolicy 2," an application 320 with tenantid 121 may issue the following query:
"SELECT pname, pcode, price FROM Product WHERE price>1000"
In this case, the query scanner 352 identifies "select," "from," and "where" as keywords, ">" as an operator, and "products" and "price" as identifiers.

Figure 4:
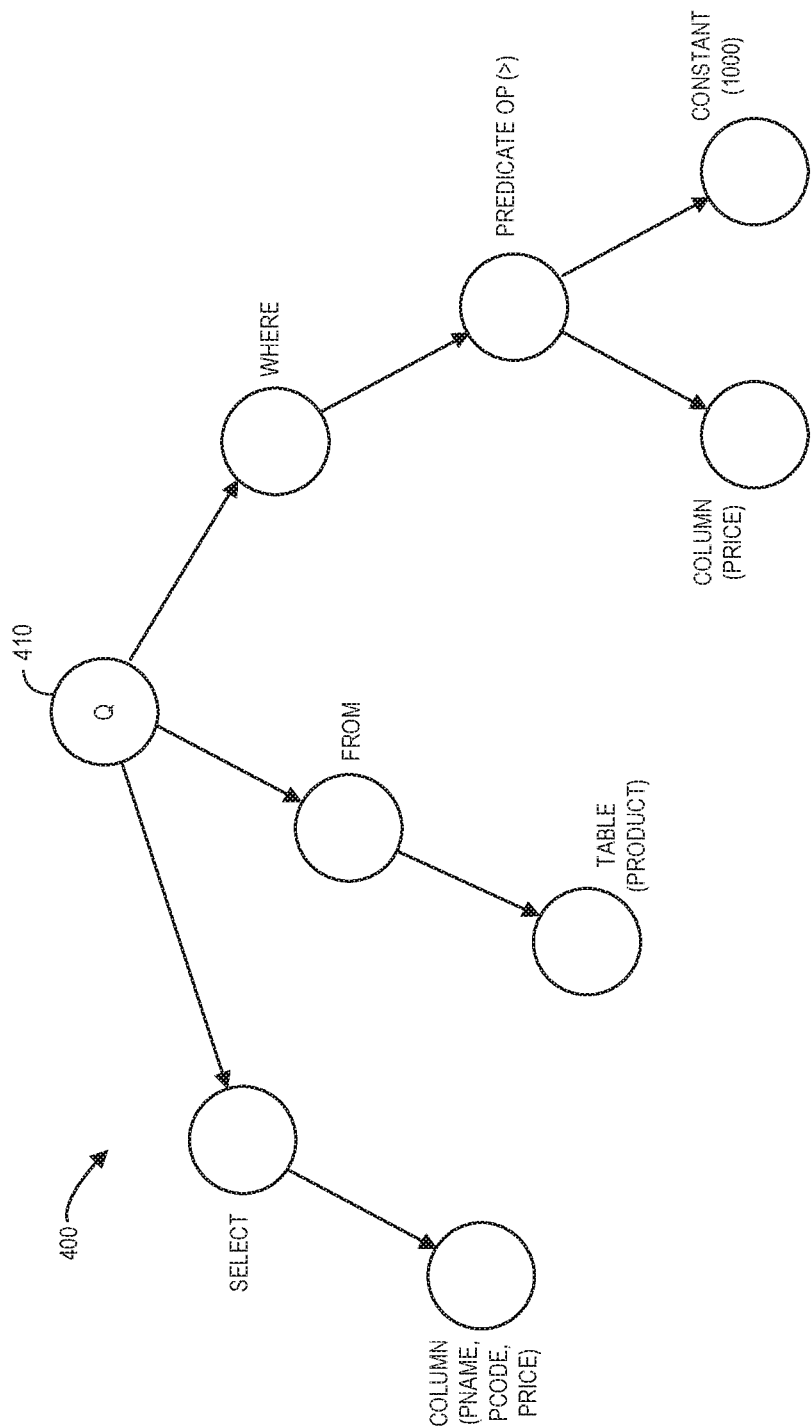
FIG. 4 is a query tree according to some embodiments.

A query parser 354 may receive the tokens as well as the query string. The query parser 354 may then parse the SQL string and create a query tree. This is done to identify whether the query string adheres to the appropriate language semantics. For example, FIG. 4 is a query tree 400 for the prior query according to some embodiments. The tree 400 includes nodes 410 for the query (e.g., "select," "from," "where," etc.

Referring again to FIG. 3, a query tree validator 356 may process the input and verify that the table/column names mentioned in the query are valid and correspond to names in a database that is being queried. A query tree processor 358 may then call the tenant policy manager 370 with the input query details. The tenant policy manager 370 can read the policies from the policy store 390 (which may be, for example, based on a file system or database). The tenant policy manager 370 can then check for the policy (or policies) applicable to the current query. The identified policy (or policies) are then returned to the query tree processor 358. In another embodiment, the tenant policy manager 370 may cache the tenant policies using caching services such as Memcached®, Hazelcast®, etc. so that the policy store 390 read hits can be reduced (resulting in better system 300 performance).

Figure 5:
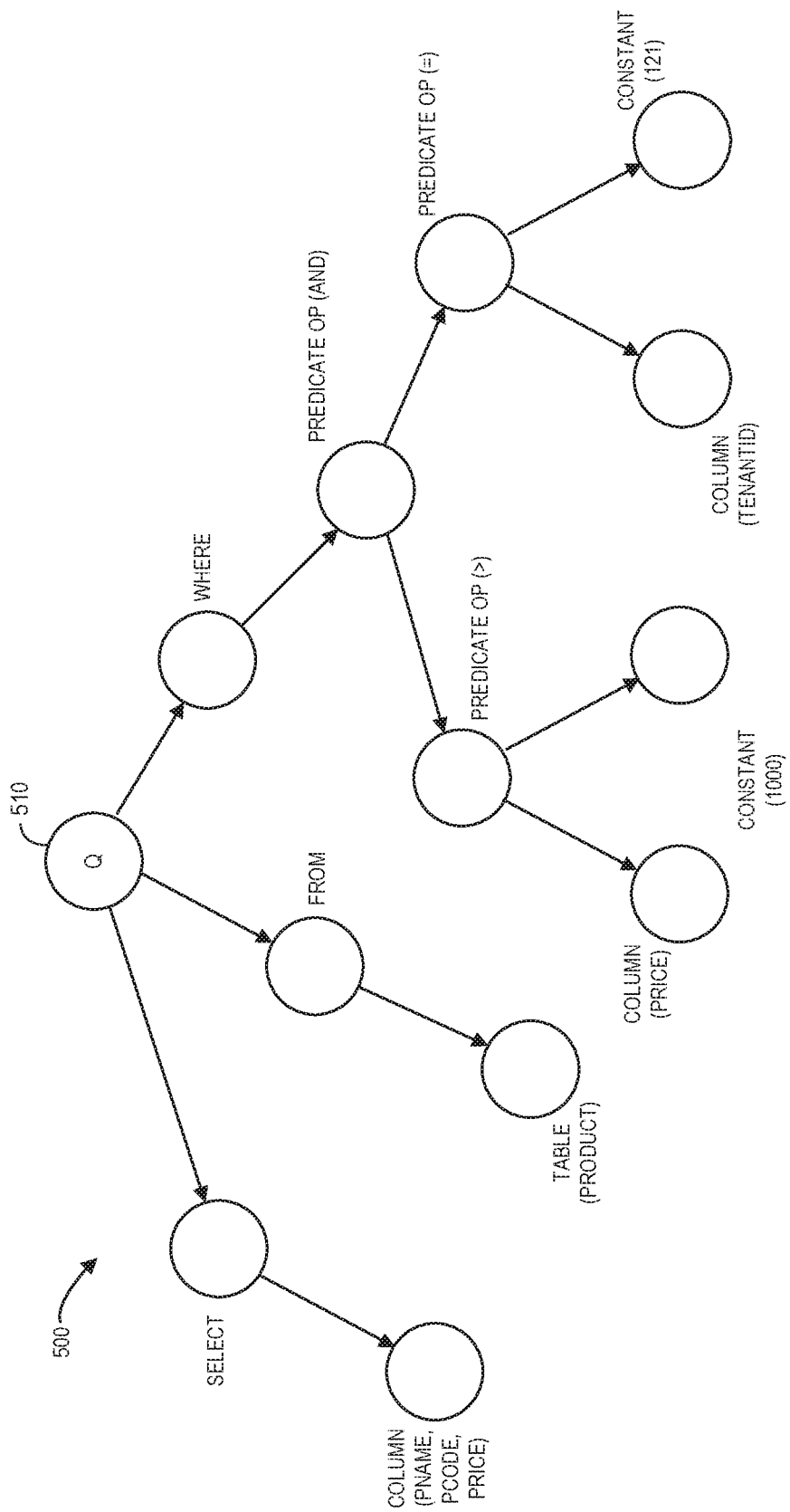
FIG. 5 is a modified query tree in accordance with some embodiments.

The query tree processor 358 may then identify any global constraint policies from the returned list of policies. If any of the identified global constraint policies rejects access to the given user 310, then the query tree processor 358 may stop any further processing and return an "access denied" error message to the calling application 320. If there are no applicable global constraint policies (or none of the identified policies are applicable), then the query tree processor 358 applies the identified policy to the query tree to form a modified query tree. For example, FIG. 5 is a modified query tree 500 for a query 510 in accordance with some embodiments. According to some embodiments, a query generator 360 forms the modified query from the query tree given as input by query tree processor 358. For example, the modified query for the prior query tree may be:

"SELECT pname, pcode, price FROM Product WHERE price>1000 AND tenanted=121"

The centralized multi-tenancy system 350 may then hit the configured multi-tenant service instance 380 with the modified query and return the result back to the calling application 320.

Figure 6:
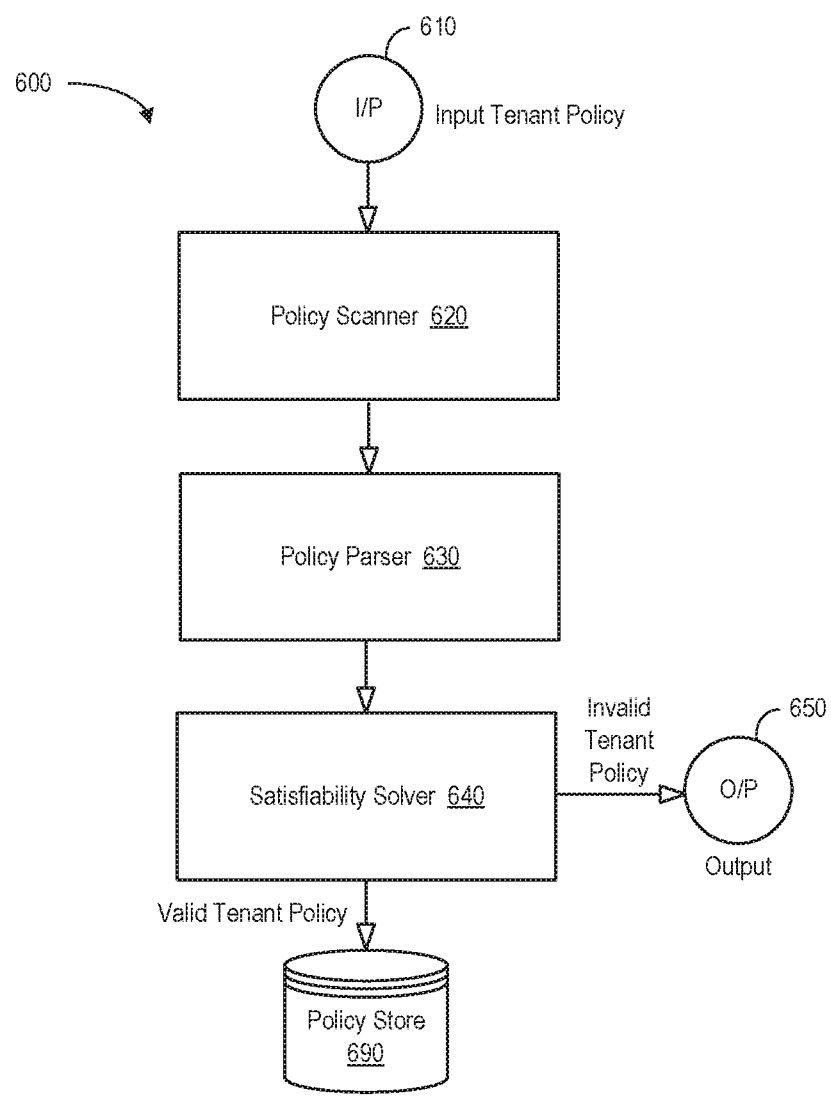
FIG. 6 is a tenant policy manager engine according to some embodiments.

FIG. 6 is a tenant policy manager engine 600 according to some embodiments. Note that the tenant policy manager engine 600 may be responsible for receiving, processing, and/or storing complicated tenant-based policies. These policies, in turn, may filter and transform the data being sent back to the applications. According to some embodiments, the tenant policy manager engine 600 includes a satisfiability solver 640 which validates policies in a static way when they are submitted to the system. Tenant policies are usually defined by the platform administrators and tenant administrators. In some embodiments, these policies are provided in a declarative form (making for easier definition by administrators)

The tenant policy manager engine 600 may receive an input ("FP") tenant policy 610 from an administrator. For example, the policy for System #1 might indicate that users with a "tenant1role" are able to access an Account_Transaction table and users with a "recommenderservice" role are not able to access that table. In order to enforce the same, the following policies may be defined and will be added one after the other.

Figure 7:
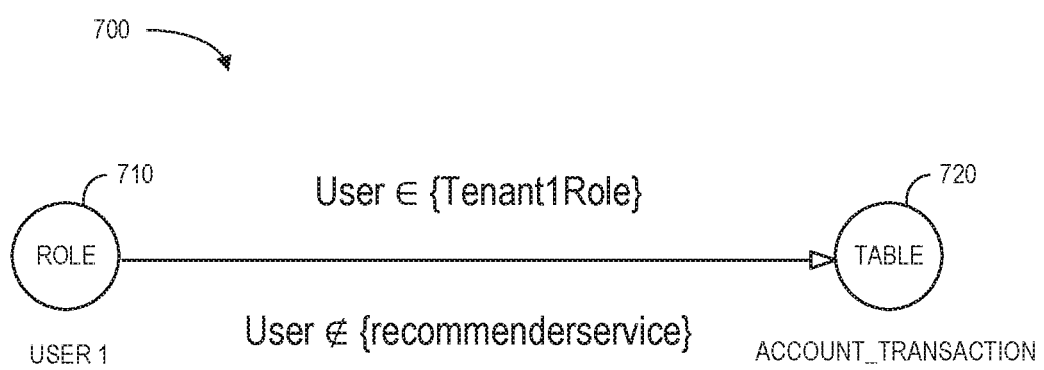
FIG. 7 is an example of a policy graph in accordance with some embodiments.

PolicyName: GCPolicy1,
Tables: Account_Transaction
Action: Reject-Access Relation Account_Transaction
Role: recommenderservice
PolicyName: Tenant1Policy2,
Tables: Account_Transaction
Action: Allow-Access Relation Account_Transaction
Role: Tenant1Role These policies may be received by a policy scanner 620 that scans the input and identifies the tokens in the policy. For example, in the first policy shown above, the policy scanner 620 may identify a table as Account_Transaction, a role as recommenderservice, and an action as reject-access. The policy scanner 620 may then call a policy parser 630 module with these input policy details. The policy parser 630 can then parse the input and create a policy graph. The policy graph might comprise, according to some embodiments, a graph in which vertices represent the artifacts involved (e.g., relations, users, etc.) and edges represent all of the possible values using a symbolic expression. These symbolic expressions may, for example, conform to first order logic which can be later evaluated by the system when required for a truth value. For instance, in the above example, FIG. 7 is an example of a policy graph 700 in accordance with some embodiments. The graph 700 include includes a role 710 (user 1) and table 720 (Account_Transaction).

Referring again to FIG. 6, the policy graph and tokens may be passed as an input to a standard satisfiability solver 640 of the tenant policy manager engine 600. The satisfiability solver 640 may solve the "satisfiability problem," that is the problem of determining if an interpretation exists that satisfies a given first order logic formula. This may involve identifying whether variables of a given formula can be given values "True" or "False" in such a way that it evaluates to "True." In the prior example, when Tenant1Policy2 is given as input, the satisfiability solver 640 may evaluate the same against the existing policy GCPolicy1 and check if an interpretation exists that could evaluate the resulting combination of these policies to "False."

If the resulting combination evaluates to "False" for all possible values, the output of the satisfiability solver 640 will be "False"—which implies an invalid policy as an output ("O/P") 650 and may result in a request that the policy be corrected. If the resulting combination evaluates to "True" for all possible values, the output of the satisfiability solver 640 will be "True"—which implies a valid policy that can be stored into a policy store 690. If the resulting combination evaluates to "False" and "True" for a subset of possible values, the output of the satisfiability solver 640 may generate a warning (which implies it may be an invalid policy) that might be over-ridden by a database administrator. In the prior example, the result always evaluates to "True" and hence the output will be "True" (implying a valid policy that will be stored).

Figure 8:
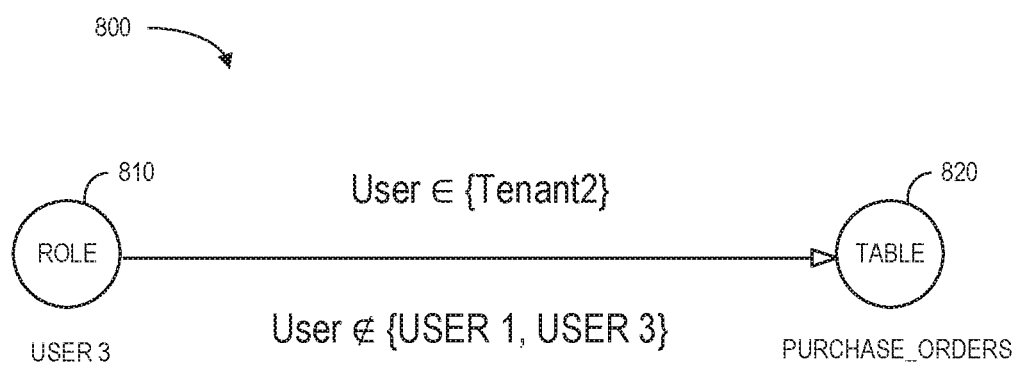
FIG. 8 is another example of a policy graph according to some embodiments.

FIG. 8 is another example of a policy graph 800 according to some embodiments. The policy graph 800 again includes a role 810 (user 3) and a table 820 (Purchase_Orders). In this example, all users (user 1, user 2, . . . user N) with role Tenant2 are given access to a table Purchase_Orders by the first policy. When the second policy to restrict user 1 and user 3 from Purchase_Orders is submitted to the policy engine 600, the satisfiability solver 640 outputs a warning because at least one combination exists for which resulting combination evaluates to "False" (the new policy will negate the existing policy for user 1 and user 3). In this situation, a tenant administrator may choose to override the warning.

The output of the satisfiability solver 640 may then be evaluated. If the output of the satisfiability solver 640 implies that a policy is valid, then it is stored in the policy store 690. If the output of the satisfiability solver 640 implies that the policy is invalid (or generates warnings), then the output is shown to the administrator for correction. In the case of a warning, the administrator may be allowed to override the warning and persist the policy to the policy 690 store. In the case of an invalid policy output, the administrator would make any necessary changes and re-submit the corrected tenant policy.

Figure 9:
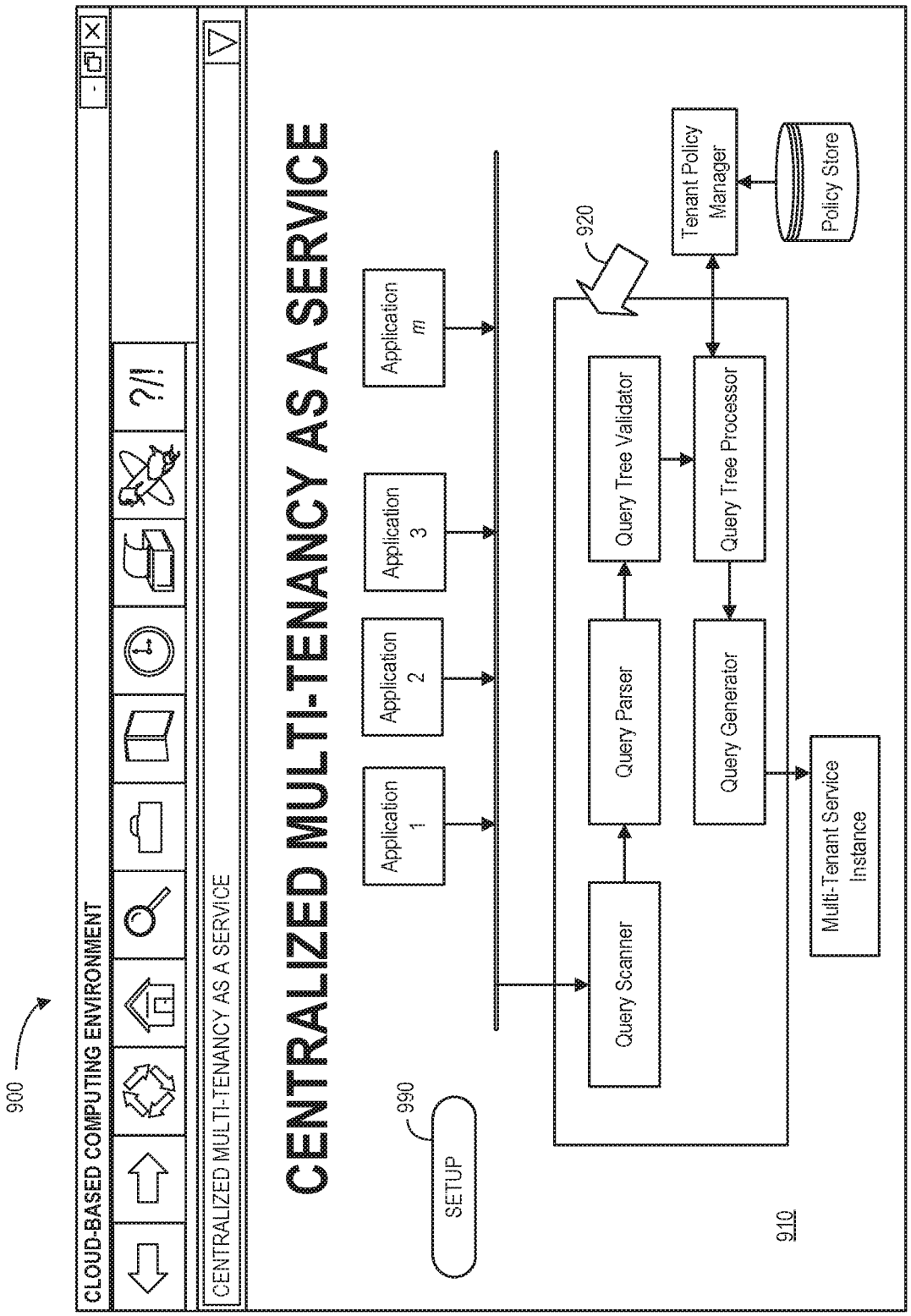
FIG. 9 is a human machine interface display according to some embodiments.

FIG. 9 is a human machine interface display associated with centralized multi-tenancy as a service according to some embodiments. The display 900 includes a graphical representation 910 of elements of a cloud-based computing environment system (e.g., to provide a centralized multi-tenancy layer). Selection of an element (e.g., via a touch-screen or computer pointer 920) may result in display of a pop-up window containing various options (e.g., to adjust rules or logic, assign various devices, configure policies, etc.). The display 900 may also include a user-selectable "Setup" icon 990 (e.g., to configure parameters for cloud management and/or provisioning (e.g., to alter or adjust a multi-tenant policy or link to a multi-tenant service instance)).

Figure 10:
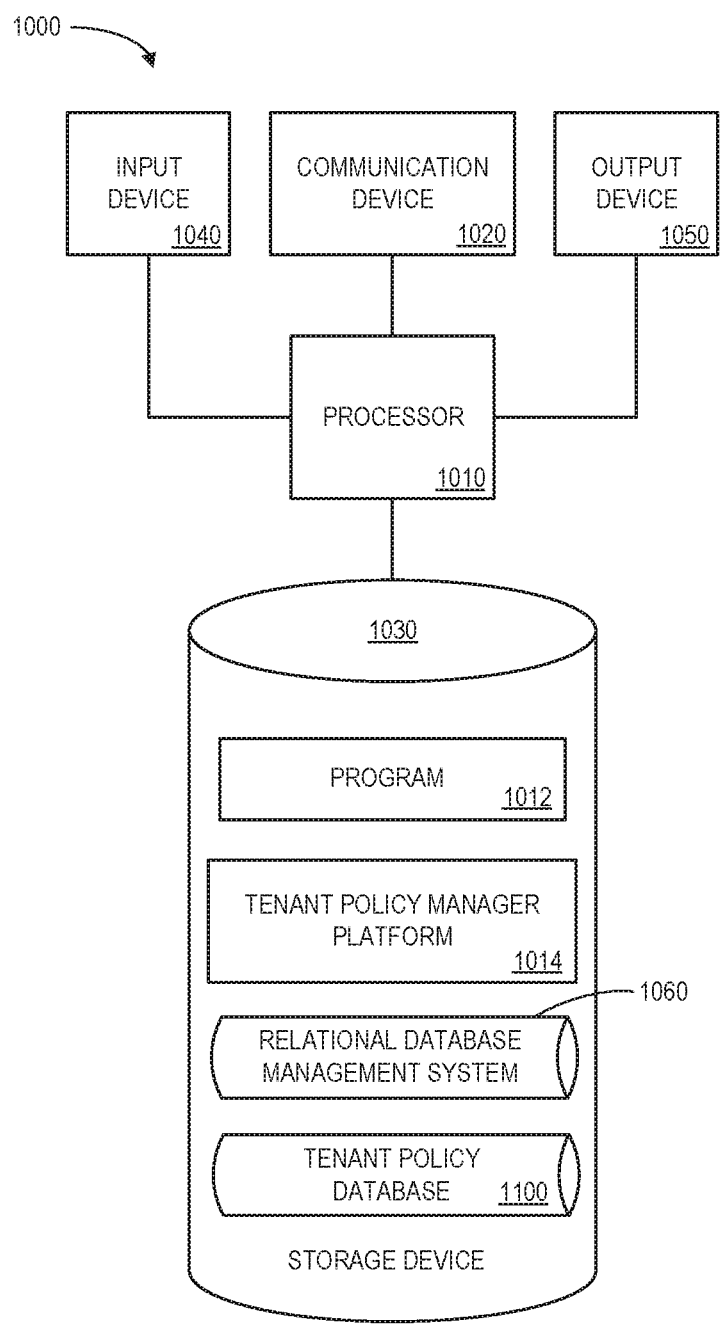
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 100 of FIG. 1 (and/or any other system described herein). The platform 1000 comprises a processor 1010, such as one or more commercially available Central Processing Units ("CPUs") in the form of one-chip microprocessors, coupled to a communication device 1060 configured to communicate via a communication network (not shown in FIG. 10). The communication device 1060 may be used to communicate, for example, with one or more remote user platforms, cloud resource providers, administrators, etc. The platform 1000 further includes an input device 1040 (e.g., a computer mouse and/or keyboard to input tenant policies, rules, or logic) and/an output device 1050 (e.g., a computer monitor to render a display, transmit recommendations, warning, and/or create data center reports). According to some embodiments, a mobile device and/or PC may be used to exchange information with the platform 1000.

The processor 1010 also communicates with a storage device 1030. The storage device 1030 can be implemented as a single database or the different components of the storage device 1030 can be distributed using multiple databases (that is, different deployment information storage options are possible). The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or tenant policy manager platform 1014 for controlling the processor 1010. The processor 1010 performs instructions of the programs 1012, 1014, and thereby operates in accordance with any of the embodiments described herein. For example, the processor 1010 may receive a query from one of a plurality of applications. The processor 1010 may also automatically process the received query based on at least one tenant policy. If the received query is not processed successfully, the processor 1010 may return an error message to the application via the application interface. If the received query is processed successfully, the processor 1010 may exchange information with a multi-tenant service instance (e.g., a multi-tenant database as a service instance) and return a data result to the application.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a Relational Database Management System ("RDBMS") 1060 and a tenant policy database 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Figure 11:
FIG. 11 illustrates a tenant policy database in accordance some embodiments.

Referring to FIG. 11, a table is shown that represents the tenant policy database 1100 that may be stored at the platform 1000 according to some embodiments. The table may include, for example, entries that define multi-tenant rules or policies associated with a service instance. The table may also define fields 1102, 1104, 1106, 1108, for each of the entries. The fields 1102, 1104, 1106, 1108 may, according to some embodiments, specify: a tenant policy identifier 1102, a tenant identifier 1104, a policy type 1106, and a declarative statement 1108. The tenant policy database 1100 may be created and updated, for example, by an administrator.

The tenant policy identifier 1102 might be a unique alphanumeric label or link that is associated with a particular multi-tenant policy. The tenant identifier 1104 might specify one or more tenants associated with the policy. The policy type 1106 might indicate that the policy is a global constraint policy, a multi-tenant policy, an anonymous policy, a data sharing policy, a temporal policy, etc. The declarative statement 1108 might define the rule associated with the tenant policy.

Thus, embodiments may provide a centralized multi-tenancy service for a cloud-based computing environment, decoupled from the application and infrastructure service (such as PostgreSQL), that can implement tenant policies in an efficient and secure manner. Moreover, a tenant policy engine may be responsible for receiving, processing, validating, and/or storing complicated tenant based declarative policies. In this way, the system may restrict, filter, and/or transform data before it is sent back to requesting applications.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
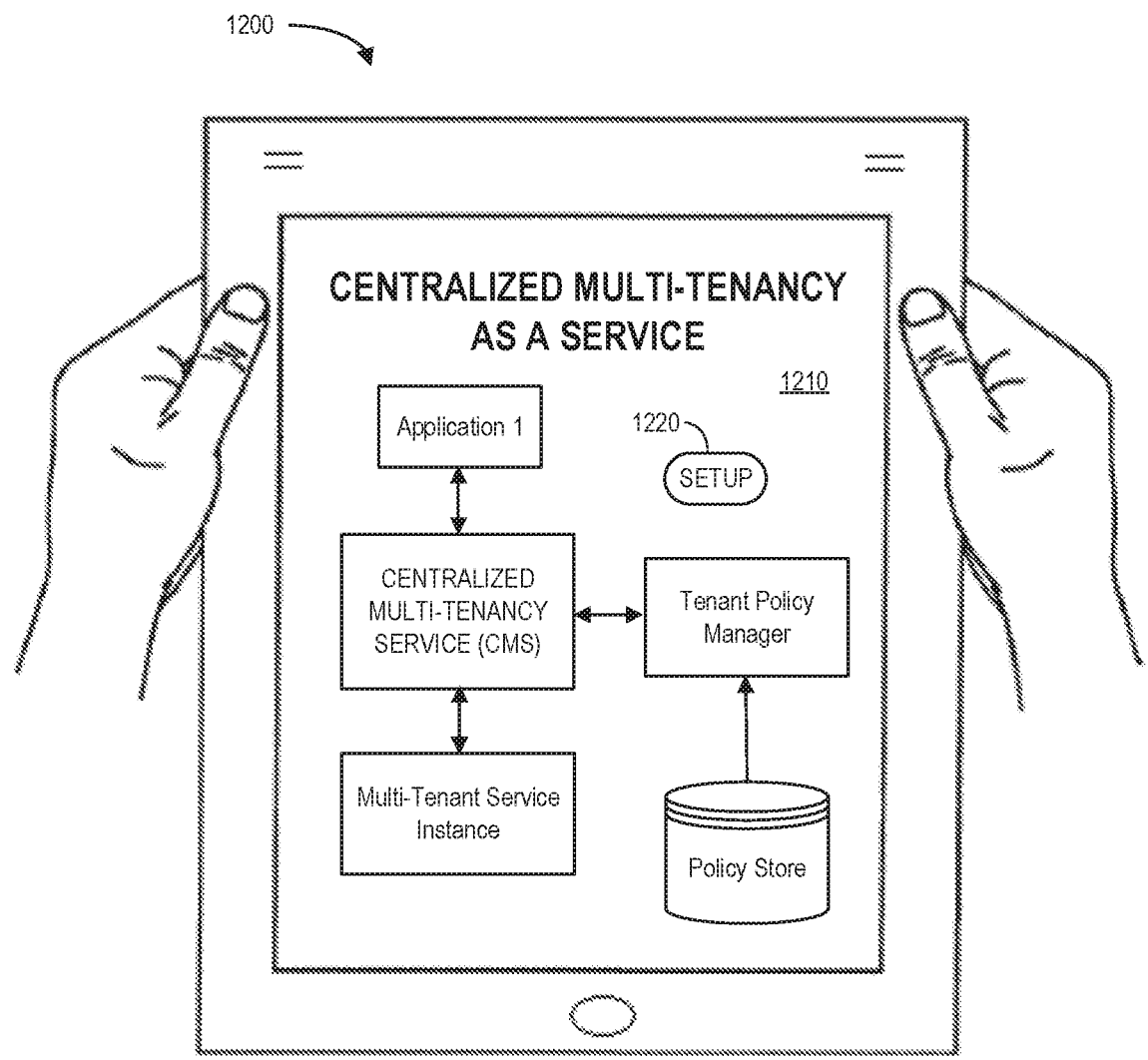
FIG. 12 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of database applications and services, any of the embodiments described herein could be applied to other types of applications and services. In addition, the displays shown herein are provided only as examples, and any other type of user interface could be implemented. For example, FIG. 12 shows a tablet computer 1200 rendering a_display 1210. The display 1210 may, according to some embodiments, be used to view more detailed elements about components of the system (e.g., when a graphical element is selected via a touchscreen) or to configure operation of the system (e.g., to_for the system via a "Setup" icon 1220).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud-based computing environment, comprising:
   a centralized multi-tenancy database as a service, including:
      an application interface to receive a query from one of a plurality of applications,
      a tenant policy store containing declarative tenant policies,
      a tenant policy manager engine, including:
         a tenant policy scanner to scan the at least one tenant policy to identify tokens in the policy,
         a tenant policy parser to parse an input from the tenant policy scanner and create a tenant policy graph in which vertices represent involved artifacts and edges represent possible values using symbolic expression, and
         a satisfiability solver to determine if an interpretation exists that satisfies a first order logic formula,
      a query tree validator to verify that any table or column names in the received query correspond to names in a database being queried,
      a query tree processor to access the tenant policy manager engine and apply the policy to form a modified query tree, and
      a query generator to re-generate the query from the modified query tree and exchange the information with the multi-tenant database as a service instance and return the data result to the application via the application interface,
      wherein the tenant policy manager engine is to automatically process the received query based on at least one tenant policy, and
         if the received query is not processed successfully, return an error message to the application via the application interface,
         if the received query is processed successfully, exchange information with a multi-tenant database as a service instance and return a data result to the application via the application interface.

2. The system of claim 1, wherein the centralized multi-tenancy database as a service executes in the same physical or virtual machine as the database as a service.

3. The system of claim 1, wherein the tenant policy is associated with at least one of: (i) a global constraint policy, (ii) a multi-tenant policy, (iii) an anonymous policy, (iv) a data sharing policy, and (v) temporal policy.

4. The system of claim 1, wherein the centralized multi-tenancy database as a service further includes:
   a query scanner to scan the received query and create a token associated with the query.

5. The system of claim 4, wherein the centralized multi-tenancy database as a service further includes:
   a query parser to receive the token along with a query string and create a query tree.

6. The system of claim 1, wherein the satisfiability solver:
   generates, for a first tenant policy based on said determination of whether an interpretation exists that satisfies the first order logic formula, a true indication that results in the policy being stored,
   generates, for a second tenant policy based on said determination of whether an interpretation exists that satisfies the first order logic formula, a false indication that results in a request for correction, and
   generates, for a third tenant policy based on said determination of whether an interpretation exists that satisfies the first order logic formula, a warning indication that can be over-ridden by a database administrator.

7. A computer-implemented method associated with a cloud-based computing environment, comprising:
   receiving, via an application interface of a centralized multi-tenancy database as a service, a query from one of a plurality of applications;
   retrieving, by a tenant policy manager engine from a tenant policy store that contains declarative tenant policies, at least one tenant policy;
   validating, by the tenant policy manager engine, the received query based on the at least one tenant policy;
   scanning, by a tenant policy scanner of the tenant policy manager engine, the at least one tenant policy to identify tokens in the policy;
   parsing, by a tenant policy parser of the tenant policy manager engine, an input from the tenant policy scanner and creating a tenant policy graph in which vertices represent involved artifacts and edges represent possible values using symbolic expression;
   determining, by a satisfiability solver of the tenant policy manager engine, if an interpretation exists that satisfies a first order logic formula;
   verifying, by a query tree validator of the centralized multi-tenancy database as a service, that any table or column names in the received query correspond to names in a database being queried;
   accessing, by a query tree processor of the centralized multi-tenancy database as a service, the tenant policy manager engine and applying the policy to form a modified query tree;
   re-generating, by a query generator of the centralized multi-tenancy database as a service, the query from the modified query tree and exchanging the information with the multi-tenant database as a database as a service instance and returning the data result to the application via the application interface;
   if the received query is not processed successfully, returning an error message to the application via the application interface; and
   if the received query is processed successfully, exchanging information with a multi-tenant database as a service instance and returning a data result to the application via the application interface.

8. The method of claim 7, wherein the centralized multi-tenancy database as a service executes in the same physical or virtual machine as the database as a service.

9. The method of claim 7, wherein the tenant policy is associated with at least one of: (i) a global constraint policy, (ii) a multi-tenant policy, (iii) an anonymous policy, (iv) a data sharing policy, and (v) temporal policy.

10. The method of claim 7, further comprising:
   scanning, by a query scanner of the centralized multi-tenancy database as a service, the received query and creating a token associated with the query.

11. The method of claim 10, further comprising:
   receiving, by a query parser of the centralized multi-tenancy database as a service, the token along with a query string and creating a query tree.

12. A non-transitory, computer readable medium storing instructions that, when executed by a computer processor cause the computer processor to perform a method associated with a cloud-based computing environment, the method comprising:

receiving, via an application interface of a centralized multi-tenancy database as a service, a query from one of a plurality of applications;

retrieving, by a tenant policy manager engine from a tenant policy store that contains declarative tenant policies, at least one tenant policy;

validating, by the tenant policy manager engine, the received query based on the at least one tenant policy;

scanning, by a tenant policy scanner of the tenant policy manager engine, the at least one tenant policy to identify tokens in the policy;

parsing, by a tenant policy parser of the tenant policy manager engine, an input from the tenant policy scanner and creating a tenant policy graph in which vertices represent involved artifacts and edges represent possible values using symbolic expression;

determining, by a satisfiability solver of the tenant policy manager engine, if an interpretation exists that satisfies a first order logic formula;

verifying, by a query tree validator of the centralized multi-tenancy database as a service, that any table or column names in the received query correspond to names in a database being queried;

accessing, by a query tree processor of the centralized multi-tenancy database as a service, the tenant policy manager engine and applying the policy to form a modified query tree;

re-generating, by a query generator of the centralized multi-tenancy database as a service, the query from the modified query tree and exchanging the information with the multi-tenant database as a database as a service instance and returning the data result to the application via the application interface;

if the received query is not processed successfully, returning an error message to the application via the application interface; and if the received query is processed successfully, exchanging information with a multi-tenant database as a service instance and returning a data result to the application via the application interface.

13. The medium of claim 12, wherein the method further comprises:

generating by the satisfiability solver, for a first tenant policy based on said determination of whether an interpretation exists that satisfies the first order logic formula, a true indication that results in the policy being stored;

generating by the satisfiability solver, for a second tenant policy based on said determination of whether an interpretation exists that satisfies the first order logic formula, a false indication that results in a request for correction; and generating by the satisfiability solver, for a third tenant policy based on said determination of whether an interpretation exists that satisfies the first order logic formula, a warning indication that can be over-ridden by a database administrator.

* * * * *